(12) United States Patent
Kitayama et al.

(10) Patent No.: US 10,814,749 B2
(45) Date of Patent: Oct. 27, 2020

(54) CLUTCH UNIT

(71) Applicant: NTN CORPORATION, Osaka (JP)

(72) Inventors: Naotsugu Kitayama, Shizuoka (JP); Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/325,463

(22) PCT Filed: Jul. 31, 2017

(86) PCT No.: PCT/JP2017/027616
§ 371 (c)(1),
(2) Date: Feb. 14, 2019

(87) PCT Pub. No.: WO2018/042991
PCT Pub. Date: Mar. 8, 2018

(65) Prior Publication Data
US 2019/0210491 A1 Jul. 11, 2019

(30) Foreign Application Priority Data
Aug. 30, 2016 (JP) .................................. 2016-168150

(51) Int. Cl.
*B60N 2/18* (2006.01)
*F16D 41/067* (2006.01)
(Continued)

(52) U.S. Cl.
CPC ............. *B60N 2/1892* (2013.01); *B60N 2/16* (2013.01); *F16D 15/00* (2013.01); *F16D 41/02* (2013.01);
(Continued)

(58) Field of Classification Search
CPC ...... B60N 2/16; B60N 2/1814; B60N 2/1864; B60N 2/1892; F16D 13/02; F16D 13/025;
(Continued)

(56) References Cited

U.S. PATENT DOCUMENTS

| 8,132,658 B2* | 3/2012 | Kawai | B60N 2/1615 |
| | | | 192/223.2 |
| 10,611,285 B2* | 4/2020 | Kuhlmann | B60N 2/1685 |

FOREIGN PATENT DOCUMENTS

| JP | 2006-189139 | 7/2006 |
| JP | 5207779 | 6/2013 |

OTHER PUBLICATIONS

International Preliminary Report on Patentability and Written Opinion of the International Searching Authority dated Mar. 5, 2019 in International (PCT) Application No. PCT/JP2017/027616.
(Continued)

Primary Examiner — Jacob S. Scott
(74) Attorney, Agent, or Firm — Wenderoth, Lind & Ponack, L.L.P.

(57) ABSTRACT

A clutch unit includes a lever-side clutch part to control transmission and interruption of rotational torque input through a lever operation and a brake-side clutch part to transmit the rotational torque from the lever-side clutch part to the output side and interrupt rotational torque reversely input from the output side. The brake-side clutch part includes an outer ring constrained in rotation, an output shaft to output the rotation, cylindrical rollers to control interruption of the rotational torque reversely input from the output shaft and transmission of the rotational torque input from the lever-side clutch part through engagement and disengagement between the outer ring and the output shaft, a friction ring to apply a rotational resistance to the output shaft, and a variable part to change the rotational resistance applied to the output shaft between the transmission and the interruption of the rotational torque.

4 Claims, 8 Drawing Sheets

(51) Int. Cl.
  *B60N 2/16*     (2006.01)
  *F16D 41/08*    (2006.01)
  *F16D 41/06*    (2006.01)
  *F16D 41/02*    (2006.01)
  *F16D 41/10*    (2006.01)
  *F16D 67/02*    (2006.01)
  *F16D 15/00*    (2006.01)

(52) U.S. Cl.
  CPC ........... *F16D 41/06* (2013.01); *F16D 41/067* (2013.01); *F16D 41/08* (2013.01); *F16D 41/105* (2013.01); *F16D 67/02* (2013.01); *B60N 2/1814* (2013.01); *B60N 2/1864* (2013.01)

(58) Field of Classification Search
  CPC .......... F16D 15/00; F16D 41/02; F16D 41/06; F16D 41/064; F16D 41/066; F16D 41/067; F16D 41/08; F16D 41/086; F16D 41/088; F16D 41/10; F16D 41/105; F16D 2041/0601; F16D 2041/0605; F16D 2041/0608; F16D 2041/0643; F16D 2041/0646; F16D 63/00; F16D 67/02
  See application file for complete search history.

(56) References Cited

OTHER PUBLICATIONS

International Search Report dated Sep. 26, 2017 in International (PCT) Application No. PCT/JP2017/027616.

\* cited by examiner

CLUTCH UNIT

TECHNICAL FIELD

The present invention relates to a clutch unit comprising a lever-side clutch part, which is configured to receive a rotational torque input through a lever operation, and a brake-side clutch part, which is configured to transmit the rotational torque from the lever-side clutch part to an output side and interrupt a rotational torque from the output side.

BACKGROUND ART

In general, in a clutch unit using engaging elements such as cylindrical rollers or balls, a clutch part is arranged between an input member and an output member. The clutch part is configured to engage and disengage the engaging elements, such as cylindrical rollers or balls, between the input member and the output member, to thereby control transmission and interruption of a rotational torque.

The present applicant has previously proposed a clutch unit assembled to a seat lifter part for an automobile, which is configured to vertically adjust a seat through a lever operation (for example, see Patent Literature 1).

The clutch unit disclosed in Patent Literature 1 includes a lever-side clutch part, which is configured to receive a rotational torque input through a lever operation, and a brake-side clutch part, which is configured to transmit the rotational torque input from the lever-side clutch part to an output side and interrupt a rotational torque reversely input from the output side.

The lever-side clutch part mainly includes an outer ring, an inner ring, cylindrical rollers, and a centering spring. The outer ring is configured to receive the rotational torque input through the lever operation. The inner ring is configured to transmit the rotational torque from the outer ring to the brake-side clutch part. The cylindrical rollers are configured to control the transmission and interruption of the rotational torque from the outer ring through engagement and disengagement in wedge gaps between the outer ring and the inner ring. The centering spring is configured to accumulate an elastic force with the rotational torque from the outer ring, and return the outer ring to a neutral state by the accumulated elastic force when the input of the rotational torque is lost.

The brake-side clutch part mainly includes an outer ring, an output shaft, a plurality of cylindrical rollers, plate springs, a cage, and a friction ring. The outer ring is constrained in rotation. The output shaft is configured to output the rotational torque. The plurality of cylindrical rollers and the plate springs are configured to control interruption of the rotational torque from the output shaft and transmission of the rotational torque from the lever-side clutch part through engagement and disengagement in wedge gaps between the outer ring and the output shaft. The cage is configured to retain the cylindrical rollers and the plate springs at equal intervals in the circumferential direction. The friction ring is configured to apply a rotational resistance to the output shaft.

In the lever-side clutch part, when the rotational torque is input to the outer ring through the lever operation, the cylindrical rollers are engaged with the wedge gaps between the outer ring and the inner ring. The rotational torque is transmitted to the inner ring thorough the engagement of the cylindrical rollers in the wedge gaps, thereby rotating the inner ring. On this occasion, as the outer ring rotates, the elastic force is accumulated in the centering spring.

When the input of the rotational torque through the lever operation is lost, the outer ring returns to the neutral state by the elastic force of the centering spring while the inner ring maintains a given rotational position. Thus, the inner ring rotates in an inching manner by repetition of the rotation of the outer ring, that is, a pumping operation on an operation lever.

In the brake-side clutch part, when the rotational torque is reversely input to the output shaft through seating on the seat, the cylindrical rollers are engaged with the wedge gaps between the output shaft and the outer ring, and the output shaft is thus locked to the outer ring. The rotational torque from the output shaft is interrupted through the locking of the output shaft. As a result, a seat surface height of the seat is maintained.

Meanwhile, when the rotational torque is input from the inner ring of the lever-side clutch part to the cage of the brake-side clutch part, the cage rotates to be brought into abutment against the cylindrical rollers, and presses the cylindrical rollers against the elastic forces of the plate springs, thereby disengaging the cylindrical rollers from the wedge gaps between the outer ring and the output shaft. As a result of the disengagement of the cylindrical rollers, the locked state of the output shaft is released, and the output shaft thus becomes rotatable. When the locked state of the output shaft is released, an appropriate rotational resistance is applied to the output shaft by the friction ring.

Then, the rotational torque from the cage is transmitted to the output shaft through a further rotation of the cage of the brake-side clutch part, thereby rotating the output shaft. In other words, when the cage rotates in the inching manner together with the inner ring of the lever-side clutch part, the output shaft also rotates in the inching manner. The inching rotation of the output shaft enables the vertical adjustment of the seat.

CITATION LIST

Patent Literature 1: JP 5207779 B2

SUMMARY OF INVENTION

Technical Problem

Incidentally, in the related-art clutch unit disclosed in Patent Literature 1, when the rotational torque is reversely input to the output shaft by the seating on the seat, the cylindrical rollers are engaged with the wedge gaps between the output shaft and the outer ring, and the output shaft is thus locked to the outer ring.

In such a manner, the rotational torque reversely input from the output shaft is locked in the brake-side clutch part, and the reverse transmission to the lever-side clutch part is interrupted. As a result, the seat is fixed, and a seat surface height is maintained.

In the clutch unit assembled to the seat lifter part for an automobile, when a vertical vibration is generated during travelling of a vehicle on a rough road or the like in a seating state on the seat, a rotational torque in a forward direction and a rotational torque in a backward direction are reversely input in an alternate and continuous manner to the output shaft.

On this occasion, in the brake-side clutch part, contact positions of the cylindrical rollers in the wedge gaps between the outer ring and the output shaft are slightly displaced, or hysteresis of an elastic deformation is present in the output shaft, the outer ring, the cylindrical rollers, and the plate springs which bear the rotational torque. Thus, the output shaft gradually rotates. As a result, there occurs such a phenomenon in which the seat is slightly lowered.

The present invention has been made in view of the above-mentioned problem, and has an object to provide a clutch unit having a structure capable of reliably locking an output shaft even when rotational torques in forward and backward directions are reversely input in a continuous manner to the output shaft.

Solution to Problem

According to one embodiment of the present invention, there is provided a clutch unit having a basic configuration comprising: a lever-side clutch part, which is provided on an input side, and is configured to control transmission and interruption of a rotational torque input through a lever operation; and a brake-side clutch part, which is provided on an output side, and is configured to transmit the rotational torque from the lever-side clutch part to the output side, and interrupt a rotational torque reversely input from the output side.

As a technical measure for achieving the above-mentioned object, the brake-side clutch part of the clutch unit according to one embodiment of the present invention comprises: a stationary member which is constrained in rotation; an output member configured to output the rotation; an engaging element configured to control the interruption of the rotational torque reversely input from the output member and the transmission of the rotational torque input from the lever-side clutch part through engagement and disengagement between the stationary member and the output member; a brake member configured to apply a rotational resistance to the output member; and a variable part configured to change the rotational resistance applied to the output member between the transmission and the interruption of the rotational torque.

In the present invention, when the rotational torque is transmitted, that is, when the rotational torque is input through the lever operation, a rotational resistance applied to the output member is set small by the variable part. Thus, when the output member is unlocked, an appropriate rotational resistance is applied to the output member by the brake member.

Meanwhile, when the rotational torque is interrupted, for example, when the output member is locked through seating on the seat, a rotational resistance applied to the output member is set large by the variable part, thereby being capable of reliably locking the output member even when the rotational torque in the forward direction and the rotational torque in the backward direction are reversely input in the alternate and continuous manner to the output member.

As a result, in the brake-side clutch part, even when a contact position of the engaging element is slightly displaced between the stationary member and the output member, or hysteresis of elastic deformation is present in the output member, the stationary member, and the engaging element which bear the rotational torque, a rotational resistance applied to the output member is set large by the variable part, thereby being capable of preventing the gradual rotation of the output member.

According to one embodiment of the present invention, it is desired that the variable part of the present invention comprise a slide member arranged so as to be movable in an axial direction relative to the brake member, and that the variable part be configured to allow the slide member to be movable in the axial direction by cooperation of a cam mechanism, which is provided between the slide member and an input member of the lever-side clutch part, and an elastic member, which is provided between the slide member and the stationary member of the brake-side clutch part.

When such a structure is employed, the slide member is easily movable in the axial direction by the cooperation of the cam mechanism and the elastic member. As a result, the rotational resistance applied to the output member can easily be changed between the transmission and the interruption of the rotational torque.

According to one embodiment of the present invention, it is desired that the variable part comprise a slide member, which is arranged so as to be movable in the axial direction relative to the brake member, and is to be joined to the brake member at a tapered surface extending in the axial direction, and that the variable part be configured to increase and decrease a slide torque, which is generated by a pressure contact between the brake member and the output member, by displacing the brake member in a radial direction by the movement of the slide member in the axial direction through the tapered surface joint.

When such a structure is employed, the displacement of the brake member in the radial direction through the tapered-surface joint by the movement of the slide member in the axial direction is promoted. As a result, the rotational resistance applied to the output member is easily changed between the transmission and the interruption of the rotational torque through increase and decrease in slide torque generated by the pressure contact with the output member.

In the clutch unit according to one embodiment of the present invention, the lever-side clutch part and the brake-side clutch part are assembled to a seat lifter part for an automobile. With such a structure, the clutch unit is suitable for use in an automobile.

Advantageous Effects of Invention

According to the present invention, the brake-side clutch part comprises the variable part configured to change the rotational resistance applied to the output member between the transmission and the interruption of the rotational torque. Thus, when the rotational torque is interrupted, a rotational resistance applied to the output member is set large by the variable part, thereby being capable of reliably locking the output member even when the rotational torque in the forward direction and the rotational torque in the backward direction are reversely input in the alternate and continuous manner to the output member.

As a result, in the brake-side clutch part, even when a contact position of the engaging element is slightly displaced between the stationary member and the output member, or hysteresis of elastic deformation is present in the output member, the stationary member, and the engaging element which bear the rotational torque, a rotational resistance applied to the output member is set large by the variable part, thereby being capable of preventing the gradual rotation of the output member.

Thus, in a case in which the brake-side clutch part is assembled to the seat lifter part for an automobile, even when a vertical vibration is generated during travelling of a vehicle on a rough road or the like in a seating state on the seat, occurrence of the phenomenon in which the seat is slightly lowered can be prevented.

DESCRIPTION OF EMBODIMENTS

Figure 1:
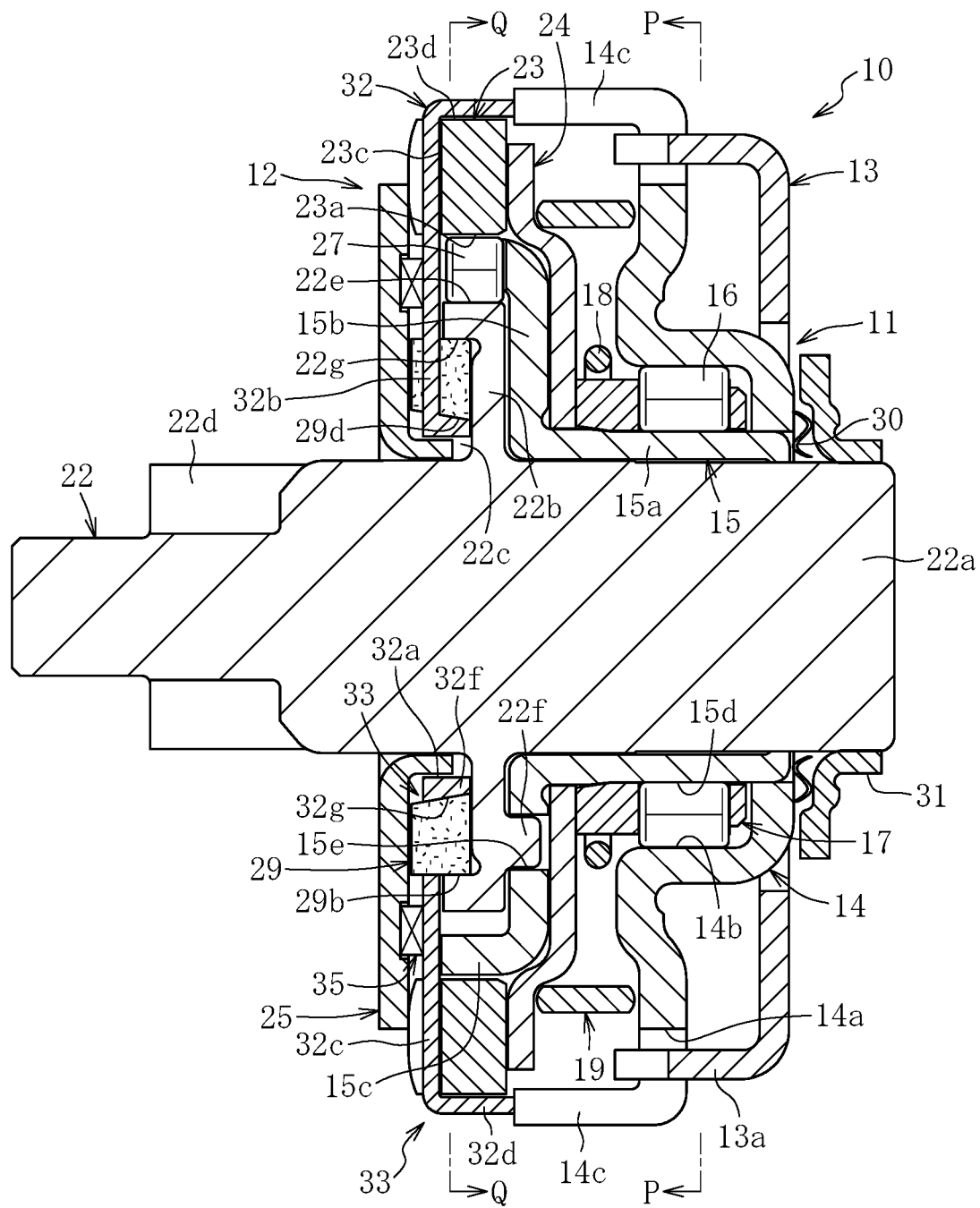
FIG. 1 is a sectional view for illustrating an overall configuration of a clutch unit according to an embodiment of the present invention.
Figure 2:
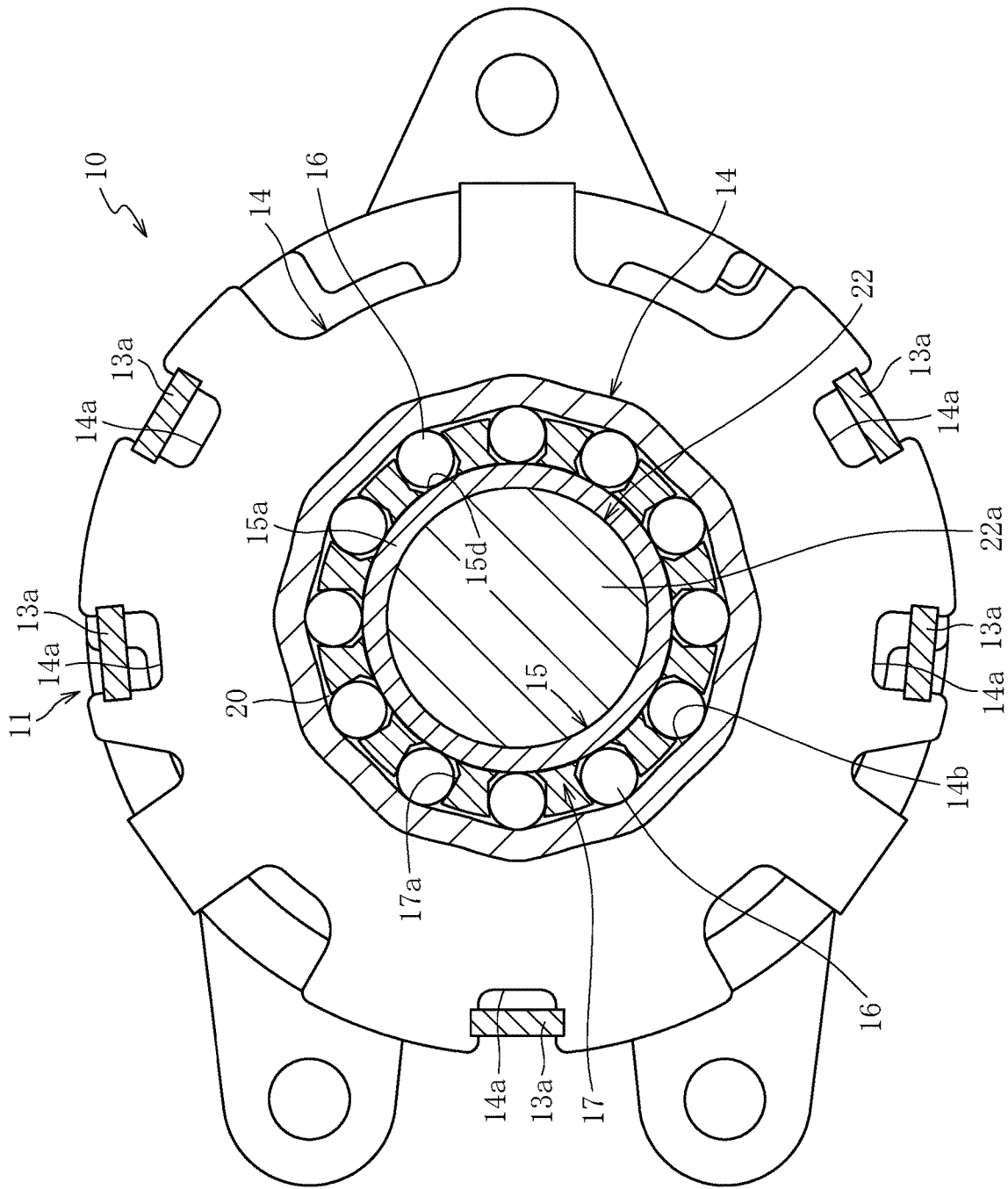
FIG. 2 is a sectional view taken along the line P-P in FIG. 1.
Figure 3:
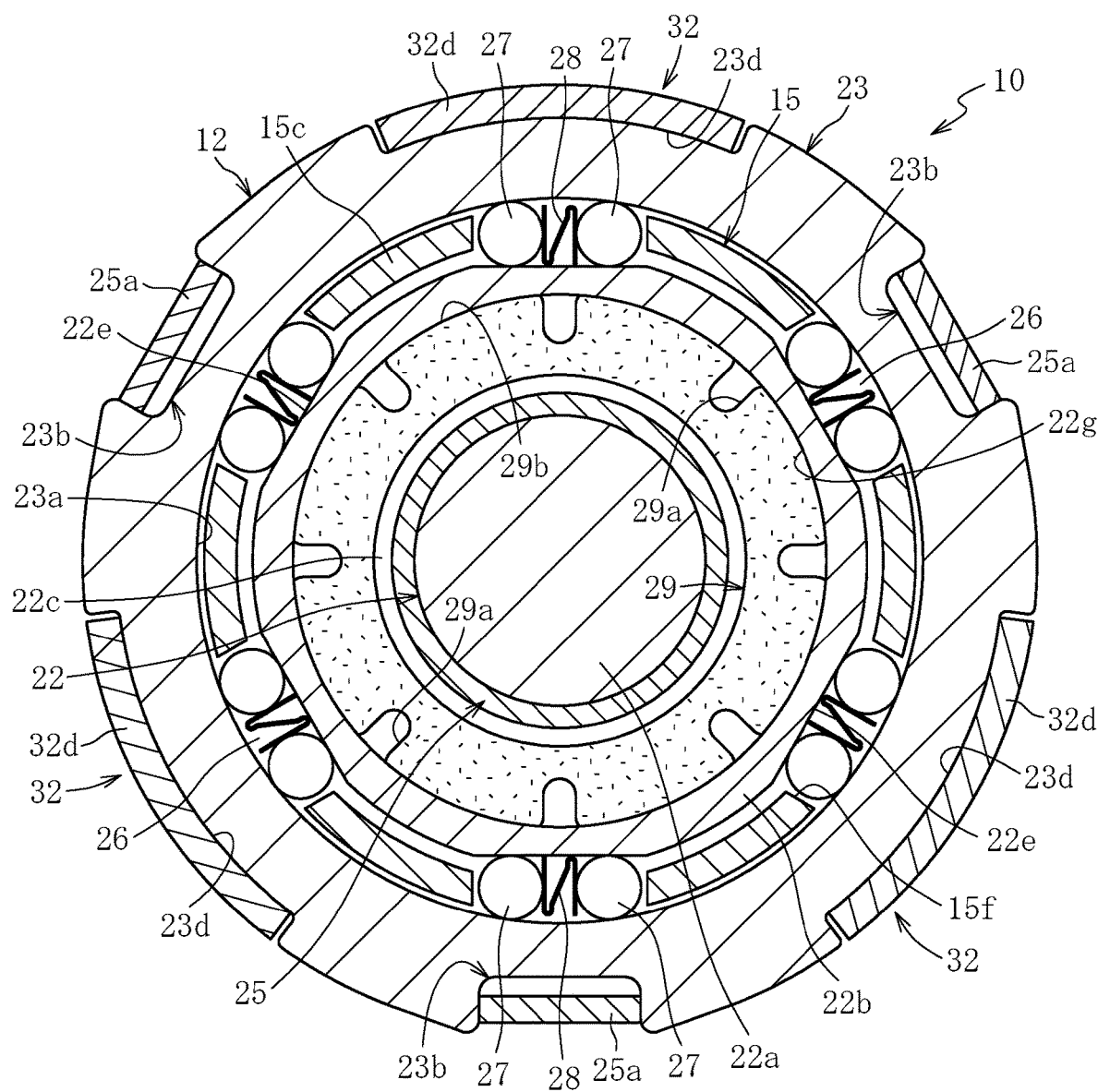
FIG. 3 is a sectional view taken along the line Q-Q in FIG. 1.

Detailed description is now given of a clutch unit according to an embodiment of the present invention with reference to the drawings. FIG. 1 is a sectional view for illustrating an overall configuration of the clutch unit according to this embodiment. FIG. 2 is a sectional view taken along the line P-P in FIG. 1. FIG. 3 is a sectional view taken along the line Q-Q in FIG. 1. Before description of a characteristic configuration of this embodiment, description is now given of the overall configuration of the clutch unit.

As illustrated in FIG. 1, the clutch unit 10 according to this embodiment has a unit structure integrally comprising a lever-side clutch part 11 and a brake-side clutch part 12. The lever-side clutch part 11 is provided on an input side, and the brake-side clutch part 12 is provided on an output side. The lever-side clutch part 11 is configured to control transmission and interruption of a rotational torque input through a lever operation. The brake-side clutch part 12 has a reverse input interrupting function of transmitting the rotational torque from the lever-side clutch part 11 to the output side and interrupting the rotational torque reversely input from the output side.

As illustrated in FIG. 1 and FIG. 2, the lever-side clutch part 11 mainly comprises aside plate 13, an outer ring 14, an inner ring 15, a plurality of cylindrical rollers 16, a cage 17, an inner centering spring 18, and an outer centering spring 19. The side plate 13 and the outer ring 14 are configured to receive the rotational torque input through the lever operation. The inner ring 15 is configured to transmit the rotational torque input from the outer ring 14 to the brake-side clutch part 12. The plurality of cylindrical rollers 16 are configured to control transmission and interruption of the rotational torque from the outer ring 14 through the engagement and disengagement between the outer ring 14 and the inner ring 15. The cage 17 is configured to retain the cylindrical rollers 16 at equal intervals in a circumferential direction. The inner centering spring 18 is configured to return the cage 17 to a neutral state. The outer centering spring 19 is configured to return the outer ring 14 to a neutral state.

In the lever-side clutch part 11, the side plate 13 is fixed to the outer ring 14 by inserting claw parts 13a formed on an outer peripheral edge portion of the side plate 13 into cutout recessed parts 14a formed in an outer peripheral edge portion of the outer ring 14, and crimping the claw parts 13a. Thus, the side plate 13 and the outer ring 14 are formed into an integrated input member of the lever-side clutch part 11.

A plurality of cam surfaces 14b are formed at equal intervals in the circumferential direction on an inner periphery of the outer ring 14. The input of the rotational torque to the outer ring 14 is performed through an operation lever 43 (see FIG. 4), which is mounted to the side plate 13 by screwing or the like and is swingable in a vertical direction.

The inner ring 15 comprises a tubular part 15a, a radially expanded part 15b, and a plurality of pillar parts 15c. The tubular part 15a is configured to receive an output shaft 22 inserted therethrough. The radially expanded part 15b is formed by extending an end portion of the tubular part 15a on a brake side radially outward. The plurality of pillar parts 15c are formed so as to protrude by bending an outer peripheral end portion of the radially expanded part 15b in an axial direction. A wedge gap 20 is formed between a cylindrical outer peripheral surface 15d of the tubular part 15a of the inner ring 15 and each of the cam surfaces 14b formed on the inner periphery of the outer ring 14. The cylindrical rollers 16 are arranged in the wedge gaps 20 at the equal intervals in the circumferential direction by the cage 17.

The inner centering spring 18 is a C-shaped elastic member having a circular cross section provided between the cage 17 and a cover 24 of the brake-side clutch part 12. Both end portions of the inner centering spring 18 are locked to parts of the cage 17 and the cover 24. When the rotational torque input from the outer ring 14 through the lever operation is applied, the inner centering spring 18 is spread outward as the cage 17 following the outer ring 14 rotates relative to the cover 24 in a stationary state, and an elastic force is thus accumulated. When the rotational torque input from the outer ring 14 is released, the inner centering spring 18 returns the cage 17 to the neutral state by the elastic force.

The outer centering spring 19 positioned on a radially outer side with respect to the inner centering spring 18 is a C-shaped band-plate elastic member arranged between the outer ring 14 and the cover 24. Both end portions of the outer centering spring 19 are locked to parts of the outer ring 14 and the cover 24. When the rotational torque input from the outer ring 14 through the lever operation is applied, the outer centering spring 19 is spread outward as the outer ring 14 rotates relative to the cover 24 in a stationary state, and an elastic force is thus accumulated. When the rotational torque input from the outer ring 14 is released, the outer centering spring 19 returns the outer ring 14 to the neutral state by the elastic force.

The cage 17 is a cylindrical member made of resin in which a plurality of pockets 17a configured to receive the cylindrical rollers 16 are formed at the equal intervals in the circumferential direction. Both of the end portions of the inner centering spring 18 are locked to one end portion of the cage 17 in the axial direction, that is, an end portion of the brake-side clutch part 12 on the cover 24 side in the axial direction. The cage 17 is arranged between the outer ring 14 and the inner ring 15.

As illustrated in FIG. 1 and FIG. 3, the brake-side clutch part 12, which is of a type called "lock type" and has the reverse input interrupting function, mainly comprises the inner ring 15, the output shaft 22, an outer ring 23, the cover 24, a side plate 25, a plurality of pairs of cylindrical rollers 27, plate springs 28, and a friction ring 29. The inner ring 15 is configured to receive the rotational torque input from the lever-side clutch part 11. The output shaft 22 serves as an output member configured to output the rotational torque from the lever-side clutch part 11. The outer ring 23, the cover 24, and the side plate 25 serve as a stationary member which is constrained in rotation. The plurality of pairs of cylindrical rollers 27 serve as engaging elements configured to control interruption of the rotational torque reversely input from the output shaft 22 and transmission of the rotational torque input from the inner ring 15 through engagement and disengagement between the outer ring 23 and the output shaft 22. The plate springs 28 each have an N-shaped cross section, and are configured to apply a separating force in the circumferential direction to the pairs of cylindrical rollers 27. The friction ring 29 serves as a brake member configured to apply a rotational resistance to the output shaft 22.

In the output shaft 22, a large-diameter part 22b extending outward in the radial direction so as to have a larger diameter is formed integrally with a center portion of a shaft part 22a in the axial direction on which the tubular part 15a of the inner ring 15 is externally inserted. A pinion gear 22d configured to be coupled to a seat lifter part 41 (see FIG. 4) is coaxially formed at an end portion of the shaft part 22a on an output side. Moreover, a washer 31 is press-fitted to an end portion of the shaft part 22a on an input side through intermediation of a wave washer 30, thereby preventing removal of the components of the lever-side clutch part 11.

A plurality of flat cam surfaces 22e are formed at equal intervals in the circumferential direction on an outer periphery of the large-diameter part 22b of the output shaft 22. The two cylindrical rollers 27 and the one plate spring 28 interposed between the two cylindrical rollers 27 are arranged in each of wedge gaps 26 formed between each of the cam surfaces 22e of the larger diameter part 22b and a cylindrical inner peripheral surface 23a of the outer ring 23. The cylindrical rollers 27 and the plate spring 28 are arranged at the equal intervals in the circumferential direction by the pillar parts 15c of the inner ring 15.

The inner ring 15 has a function as an input member of the brake-side clutch part 12 by transmitting the rotational torque input from the outer ring 14 of the lever-side clutch part 11 to the output shaft 22 through the radially expanded part 15b. Moreover, the inner ring 15 has a function as a cage by receiving the cylindrical rollers 27 and the plate springs 28 in pockets 15f and retaining the cylindrical rollers 27 and the plate springs 28 by the pillar parts 15c at the equal intervals in the circumferential direction.

A protrusion 22f configured to transmit the rotational torque from the inner ring 15 to the output shaft 22 is formed on the large-diameter part 22b of the output shaft 22. The protrusion 22f is inserted and arranged with a clearance in the circumferential direction in a hole 15e formed in the radially expanded part 15b of the inner ring 15 (see FIG. 1). In such a manner, the output shaft 22 and the inner ring 15 are coupled to each other so as to be capable of transmitting the torque through the protrusion 22f and the hole 15e.

In the brake-side clutch part 12, the outer ring 23 and the cover 24 are fixed to the side plate 25 by inserting claw parts 25a formed on an outer peripheral edge portion of the side plate 25 into cutout recessed parts 23b formed in an outer peripheral edge portion of the outer ring 23 having a thick plate shape and cutout recessed parts (not shown) formed in an outer peripheral edge portion of the cover 24, and crimping the claw parts 25a. As a result, the outer ring 23, the cover 24, and the side plate 25 are integrated as a stationary member of the brake-side clutch part 12.

The friction ring 29 is a member formed into a ring shape by applying injection-molding or the like on a resin material, and is press-fitted with interference to an inner peripheral surface 22g of an annular recessed part 22c formed in the large-diameter part 22b of the output shaft 22. A rotational resistance is applied to the output shaft 22 by a slide torque generated by a pressure contact between an outer peripheral surface 29b of the friction ring 29 and the inner peripheral surface 22g of the annular recessed part 22c of the output shaft 22 when the lever is operated. A plurality of cutout grooves 29a are formed on an outer periphery of the friction ring 29 for providing elasticity. As a result, an appropriate rotational resistance can be applied to the output shaft 22.

Description is now given of an operation example of the lever-side clutch part 11 and the brake-side clutch part 12 having the configuration described above.

In the lever-side clutch part 11, when the rotational torque is input to the outer ring 14 through the lever operation, the cylindrical rollers 16 are engaged with the wedge gaps 20 between the cam surfaces 14b of the outer ring 14 and the cylindrical outer peripheral surface 15d of the inner ring 15. The rotational torque is transmitted to the inner ring 15 thorough the engagement of the cylindrical rollers 16 in the wedge gaps 20, thereby rotating the inner ring 15. On this occasion, as the outer ring 14 and the cage 17 rotate, the elastic forces are accumulated in both of the centering springs 18 and 19.

When the input of the rotational torque through the lever operation is lost, the cage 17 and the outer ring 14 return to the respective neutral states by the elastic forces of both of the centering springs 18 and 19. Meanwhile, the inner ring 15 maintains a given rotational position. Thus, the inner ring 15 rotates in an inching manner by repetition of the rotation of the outer ring 14, that is, a pumping operation on the operation lever 43.

In the brake-side clutch part 12, even when a rotational torque is reversely input to the output shaft 22 by seating on a seat 40 (see FIG. 4), the cylindrical rollers 27 are engaged with the wedge gaps 26 between the cam surfaces 22e of the output shaft 22 and the cylindrical inner peripheral surface 23a of the outer ring 23, and the output shaft 22 is thus locked to the outer ring 23. In such a manner, the rotational torque reversely input from the output shaft 22 is locked by the brake-side clutch part 12, and reverse transmission to the lever-side clutch part 11 is interrupted. As a result, a seat surface height of the seat 40 is maintained.

Meanwhile, when the rotational torque is input from the inner ring 15 of the lever-side clutch part 11 to the pillar parts 15c through the lever operation, the pillar parts 15c are brought into abutment against the cylindrical rollers 27, and press the cylindrical rollers 27 against the elastic forces of the plate springs 28. With this, the cylindrical rollers 27 are disengaged from the wedge gaps 26. As a result of the disengagement of the cylindrical rollers 27 from the wedge gaps 26, the locked state of the output shaft 22 is released, and the output shaft 22 thus becomes rotatable. When the locked state of the output shaft 22 is released, an appropriate rotational resistance is applied to the output shaft 22 by the friction ring 29.

When the pillar parts 15c of the inner ring 15 further rotate, the clearance between the hole 15e of the radially expanded part 15b of the inner ring 15 and the protrusion 22f of the large-diameter part 22b of the output shaft 22 decreases, and the radially expanded part 15b of the inner ring 15 is brought into abutment against the protrusion 22f of the output shaft 22 in the rotational direction. As a result, the rotational torque from the lever-side clutch part 11 is transmitted to the output shaft 22 via the protrusion 22f, and the output shaft 22 thus rotates. In other words, when the pillar parts 15c of the inner ring 15 rotate in the inching manner, the output shaft 22 also rotates in the inching manner. As a result, the seat 40 can be vertically adjusted.

Figure 4:
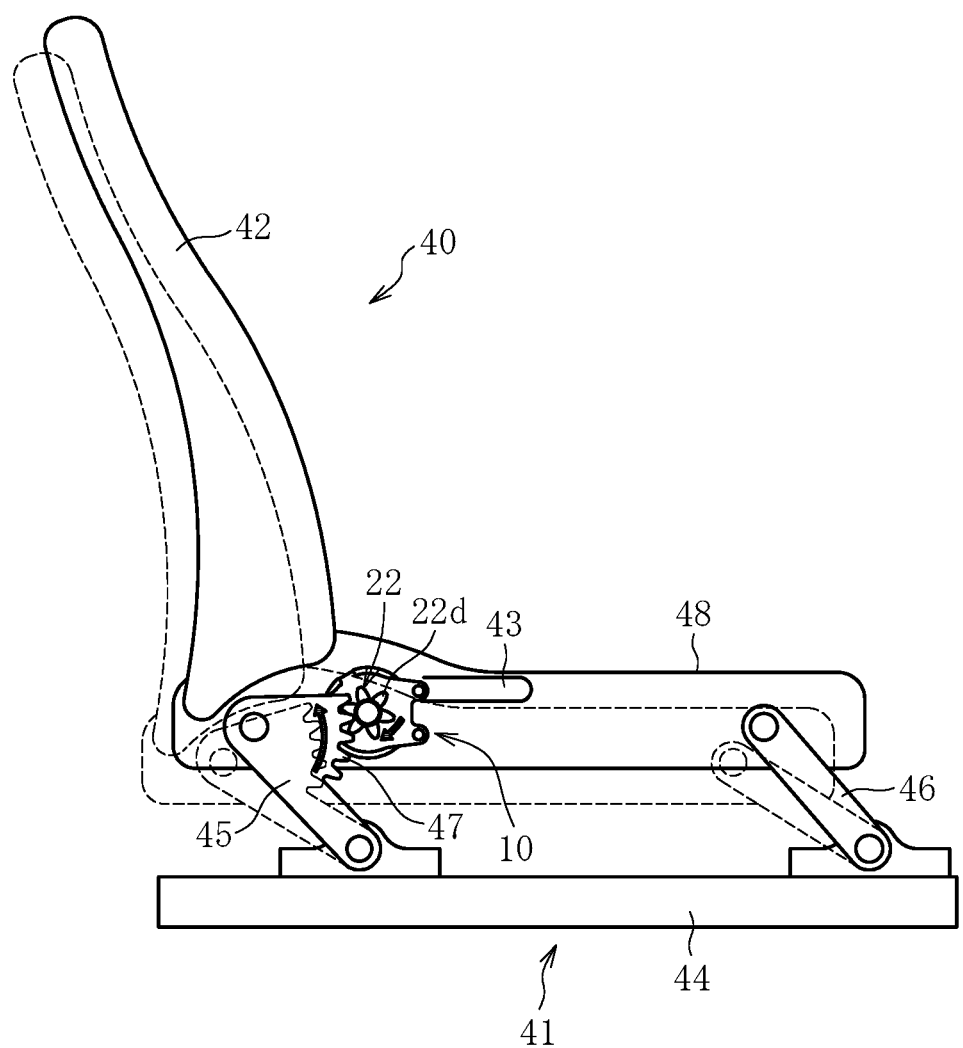
FIG. 4 is a configuration view for illustrating a seat for an automobile and a seat lifter part.

The clutch unit 10 having the structure described above is used after being assembled to the seat lifter part 41 for an automobile, which is configured to adjust a height of the seat 40 through the lever operation. FIG. 4 is a view for illustrating the seat 40 installed in a cabin of an automobile.

As illustrated in FIG. 4, the seat 40 comprises a seating seat 48 and a backrest seat 42, and a height of a seat surface of the seating seat 48 is adjusted by the seat lifter part 41. The height adjustment of the seating seat 48 is performed through the operation lever 43 mounted to the side plate 13 of the lever-side clutch part 11 (see FIG. 1) in the clutch unit 10.

The seat lifter part 41 has the following structure. One ends of link members 45 and 46 are pivotably mounted to a slidable member 44. Another ends of the link members 45 and 46 are pivotably mounted to the seating seat 48. A sector gear 47 is provided integrally with another end of the link member 45. The sector gear 47 meshes with the pinion gear 22d of the output shaft 22 of the clutch unit 10.

For example, when the seat surface of the seating seat 48 is to be lowered, the locked state of the brake-side clutch part (see FIG. 1) is released through the lever operation in the lever-side clutch part 11, in other words, by swinging the operation lever 43 downward. When the brake-side clutch part 12 is unlocked, the seat surface of the seating seat 48 can smoothly be lowered by applying the appropriate rotational resistance to the output shaft 22 through the friction ring 29 (see FIG. 1).

As a result of the unlocking of the brake-side clutch part 12, the pinion gear 22d of the output shaft 22 of the brake-side clutch part 12 is turned clockwise (in a direction indicated by the arrow of FIG. 4) by a rotational torque transmitted from the lever-side clutch part 11 to the brake-side clutch part 12. Then, the sector gear 47 meshing with the pinion gear 22d swings counterclockwise (in a direction indicated by the arrow of FIG. 4). As a result, both of the link member 45 and the link member 46 tilt so that the seat surface of the seating seat 48 is lowered.

In such a manner, when the operation lever 43 is released after the height of the seat surface of the seating seat 48 is adjusted, the operation lever 43 swings upward by the elastic forces of both of the centering springs 18 and 19, and returns to an original position (neutral state). When the operation lever 43 is swung upward, the seat surface of the seating seat 48 is raised through an operation opposite to the operation described above. When the operation lever 43 is released after the height adjustment of the seating seat 48, the operation lever 43 swings downward, and returns to the original position (neutral state).

The overall configuration of the clutch unit 10 according to the embodiment and the seat lifter part 41 into which the clutch unit 10 is assembled are as described above. Detailed description is now given of the characteristic configuration of the clutch unit 10.

While the output shaft 22 is locked in the brake-side clutch part 12, when a vertical vibration is generated during travelling of a vehicle on a rough road or the like in a seating state on the seat 40 (see FIG. 4), a rotational torque in a forward direction and a rotational torque in a backward direction are reversely input in an alternate and continuous manner to the output shaft 22. In order to reliably lock the output shaft 22 even when the rotational torques in the forward and backward directions are reversely input in a continuous manner to the output shaft 22, the following structure is provided.

Figure 5:
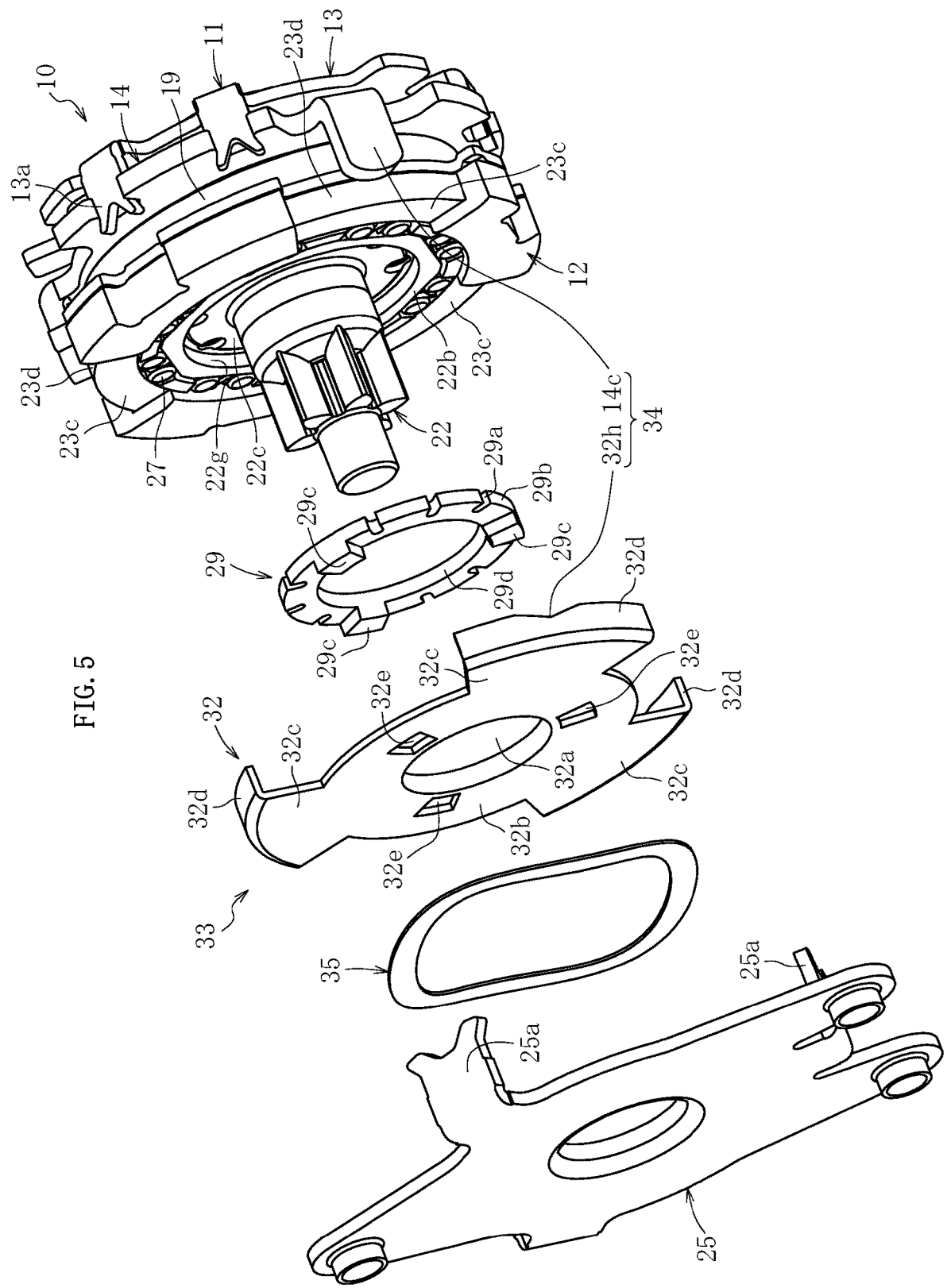
FIG. 5 is an assembly exploded perspective view for illustrating the clutch unit of FIG. 1 as viewed from an output side.
Figure 6:
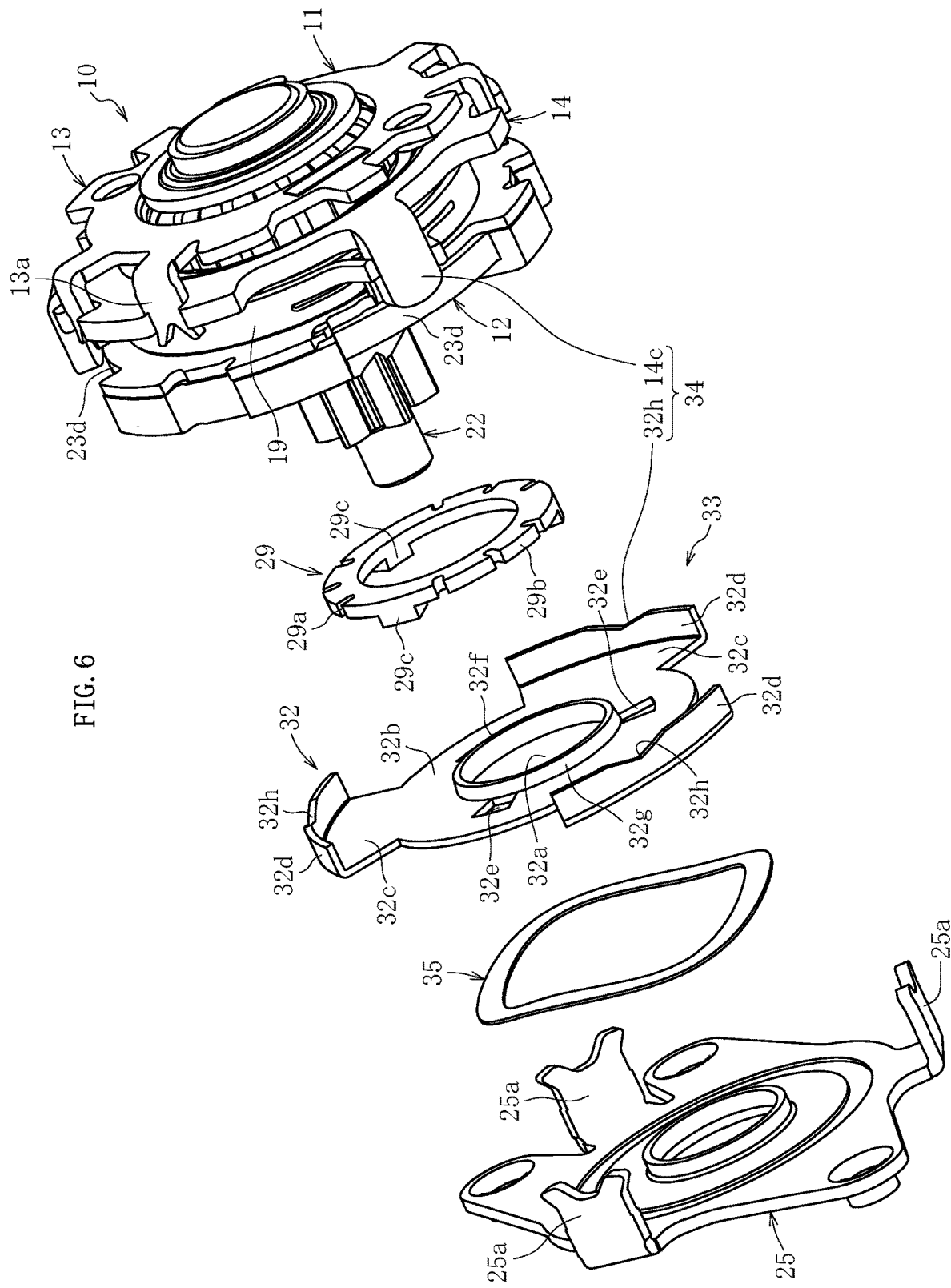
FIG. 6 is an assembly exploded perspective view for illustrating the clutch unit of FIG. 1 as viewed from an input side.

As illustrated in FIG. 1, FIG. 5, and FIG. 6, the brake-side clutch part 12 according to this embodiment comprises a variable part 33 configured to change the rotational resistance applied to the output shaft 22 by the friction ring 29 between the time of inputting the rotational torque (the transmission of the rotational torque) through the lever operation and the time of locking the output shaft 22 (the interruption of the rotational torque) through the seating on the seat 40.

The variable part 33 comprises a slide member 32 arranged so as to be movable in the axial direction relative to the friction ring 29. The variable part 33 is configured to allow the slide member 32 to be movable in the axial direction by cooperation of a cam mechanism 34, which is provided between the slide member 32 and the outer ring 14 of the lever-side clutch part 11, and an elastic member 35, which is provided between the slide member 32 and the side plate 25 of the brake-side clutch part 12.

The slide member 32 comprises a ring-shaped main body 32b, flange parts 32c, and collar parts 32d. The ring-shaped main body 32b has, on an inner periphery thereof, a shaft hole 32a. The flange parts 32c are provided at a plurality of positions (three positions in this embodiment) at equal intervals in the circumferential direction on an outer periphery of the ring-shaped main body 32b so as to extend outward in the radial direction. The collar parts 32d each extend in the axial direction from the flange part 32c.

In correspondence to this configuration, recessed parts 23c respectively corresponding to the flange parts 32c of the slide member 32 are formed in an end surface of the outer ring 23. Further, recessed parts 23d respectively corresponding to the collar parts 32d of the slide member 32 are formed in an outer peripheral surface of the outer ring 23.

The slide member 32 is assembled to the outer ring 23 by inserting the output shaft 22 through a shaft hole 32a of the ring-shaped main body 32b, receiving the flange parts 32c in the recessed parts 23c of the end surface of the outer ring 23, and fitting the collar parts 32d to the recessed parts 23d of the outer peripheral surface of the outer ring 23.

A movement of the slide member 32 in the axial direction relative to the outer ring 23 is allowed by receiving the flange parts 32c of the slide member 32 in the recessed parts 23c of the outer ring 23. Moreover, a movement in the circumferential direction (rotation) of the slide member 32 relative to the outer ring 23 is restricted by fitting the collar parts 32d of the slide member 32 to the recessed parts 23d of the outer ring 23.

Moreover, the slide member 32 comprises mounting holes 32e formed at a plurality of positions (three positions in this embodiment) in the circumferential direction around the shaft hole 32a of the ring-shaped main body 32b. Correspondingly to this configuration, the friction ring 29 comprises a plurality of (three in this embodiment) protrusions 29c formed on an end surface opposed to the ring-shaped main body 32b of the slide member 32. The slide member 32 and the friction ring 29 only need to respectively comprise at least one mounting hole 32e and protrusion 29c.

With the structure of the friction ring 29 comprising the mounting holes 32e of the slide member 32 and the protrusions 29c, the friction ring 29 is assembled to the slide member 32 by fitting the protrusions 29c thereof to the mounting holes 32e of the slide member 32.

In the fitting structure between the protrusions 29c of the friction ring 29 and the mounting holes 32e of the slide member 32, a relative rotation is restricted by eliminating a gap in the circumferential direction between each of the protrusions 29c and each of the mounting holes 32c. A displacement of the friction ring 29 in the radial direction is enabled by forming a gap in the radial direction between each of the protrusions 29c and each of the mounting holes 32e.

Further, a tubular part 32f extending in the axial direction is formed integrally with the ring-shaped main body 32b in a peripheral edge portion of the shaft hole 32a in the slide member 32. A tapered surface 32g extending in the axial direction is formed on an outer periphery of the tubular part 32f. The tapered surface 32g is formed so that the outer periphery of the tubular part 32f is radially contracted toward the input side of the clutch unit 10.

In contrast, a tapered surface 29d to be joined to the tapered surface 32g of the slide member 32 is formed so as to extend in the axial direction on an inner periphery of the friction ring 29. The tapered surface 29d is formed so that the inner periphery of the friction ring 29 is radially contracted toward the input side of the clutch unit 10.

Figure 7:
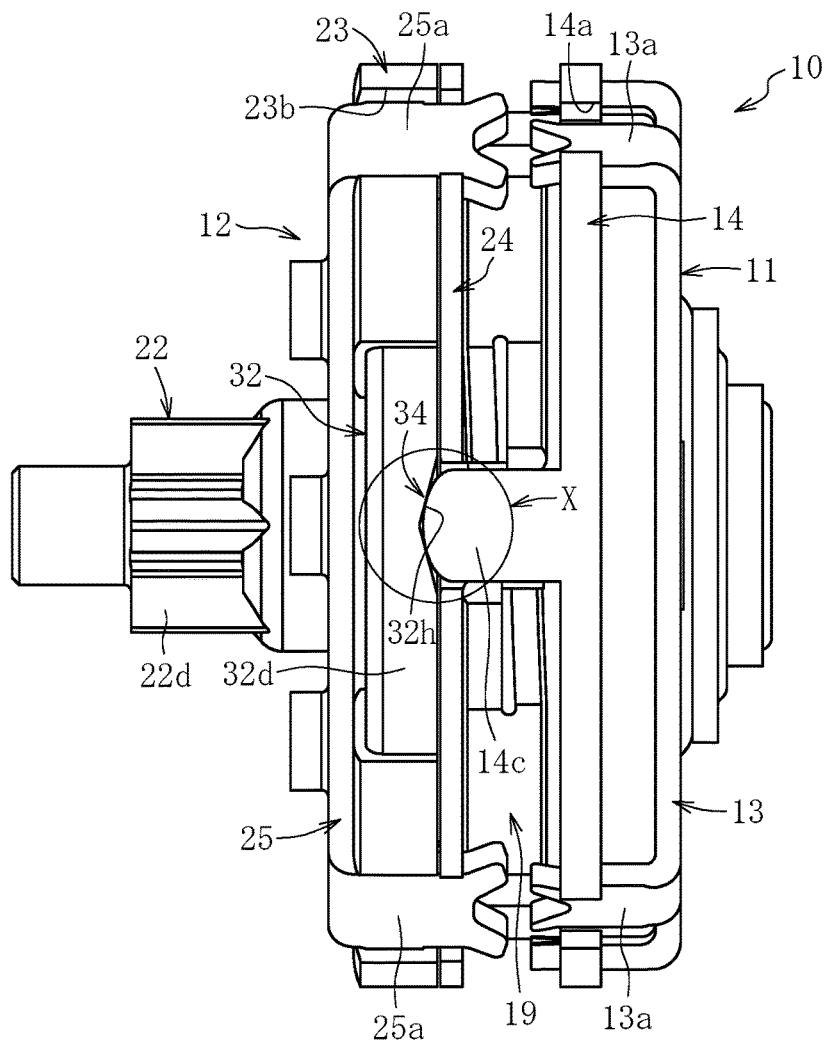
FIG. 7 is a front view for illustrating the clutch unit of FIG. 1.
Figure 8:
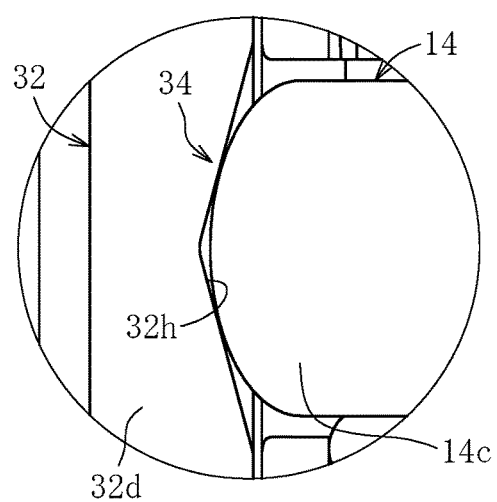
FIG. 8 is an enlarged view for illustrating a portion X of FIG. 7.

Meanwhile, as illustrated in FIG. 7 and FIG. 8, the cam mechanism 34 comprises cam grooves 32h and protruding parts 14c. The cam grooves 32h each have a V-shape and are formed in end surfaces of the collar parts 32d of the slide member 32. The protruding parts 14c extend in the axial direction from the outer periphery of the outer ring 14 of the lever-side clutch part 11. A distal-end curve forming part of each of the protruding parts 14c of the outer ring 14 is brought into abutment against a cam surface of each of the cam grooves 32h of the slide member 32 in the cam mechanism 34.

Moreover, as illustrated in FIG. 1, FIG. 5, and FIG. 6, the elastic member 35 configured to urge such an elastic force as to press the slide member 32 toward the lever-side clutch part 11 side is interposed between the side plate 25 of the brake-side clutch part 12 and the slide member 32. As this elastic member 35, for example, a wave spring having a ring shape as illustrated is preferred.

In the clutch unit 10 according to this embodiment, the outer ring 14 is maintained in the neutral state by the outer centering spring 19 under the state in which the rotational torque is not input from the outer ring 14 of the lever-side clutch part 11. On this occasion, in the brake-side clutch part 12, the output shaft 22 is in the locked state through engagement of the cylindrical rollers 27 with the wedge gaps 26 between the outer ring 23 and the output shaft 22.

Meanwhile, in the cam mechanism 34 of the brake-side clutch part 12, the protruding parts 14c of the outer ring 14 of the lever-side clutch part 11 and the cam grooves 32h of the slide member 32 are at neutral positions (see FIG. 7 and FIG. 8). Therefore, the slide member 32 is pressed in the axial direction by an elastic force of the elastic member 35, and the tapered surface 32g of the tubular part 32f of the slide member 32 presses the friction ring 29 outward in the radial direction through the tapered surface 29d of the friction ring 29.

This pressing force acts to cause the friction ring 29 to be displaced outward in the radial direction (radially expanded), and an outer peripheral surface 29b of the friction ring 29 is firmly pressed against the inner peripheral surface 22g of the annular recessed part 22c of the output shaft 22. On this occasion, the plurality of cutout grooves 29a are formed in the outer periphery of the friction ring 29 for providing elasticity, and the radial expansion of the friction ring 29 is thus promoted.

As a result, the friction torque generated by the pressure contact between the outer peripheral surface 29b of the friction ring 29 and the inner peripheral surface 22g of the annular recessed part 22c of the output shaft 22 increases. Therefore, the rotational resistance applied to the output shaft 22 can be increased from that upon the transmission of the rotational torque through the lever operation.

In this locked state of the output shaft 22, even when the vertical vibration is generated during travelling of the vehicle travel on a rough road or the like in the seating state on the seat 40 (see FIG. 4), and the rotational torque in the forward direction and the rotational torque in the backward direction are reversely input in the alternate and continuous manner to the output shaft 22 as a result of the vertical vibration, the friction ring 29 joined to the slide member 32 at the tapered surfaces 32g and 29d is firmly pressed against the output shaft 22 through the radial expansion of the friction ring 29, thereby being capable of reliably locking the output shaft 22.

As a result, in the brake-side clutch part 12, even when contact positions of the cylindrical rollers 27 are slightly displaced between the outer ring 23 and the output shaft 22, or hysteresis of elastic deformation is present in the output shaft 22, the outer ring 23, and the cylindrical rollers 27 bearing the rotational torque, the friction ring 29 joined to the slide member 32 at the tapered surfaces 32g and 29d is firmly pressed against the output shaft 22 through the radial expansion of the friction ring 29, thereby being capable of avoiding a gradual rotation of the output shaft 22. Thus, such a phenomenon as a slight downward movement of the seat 40 can be prevented.

Figure 9:
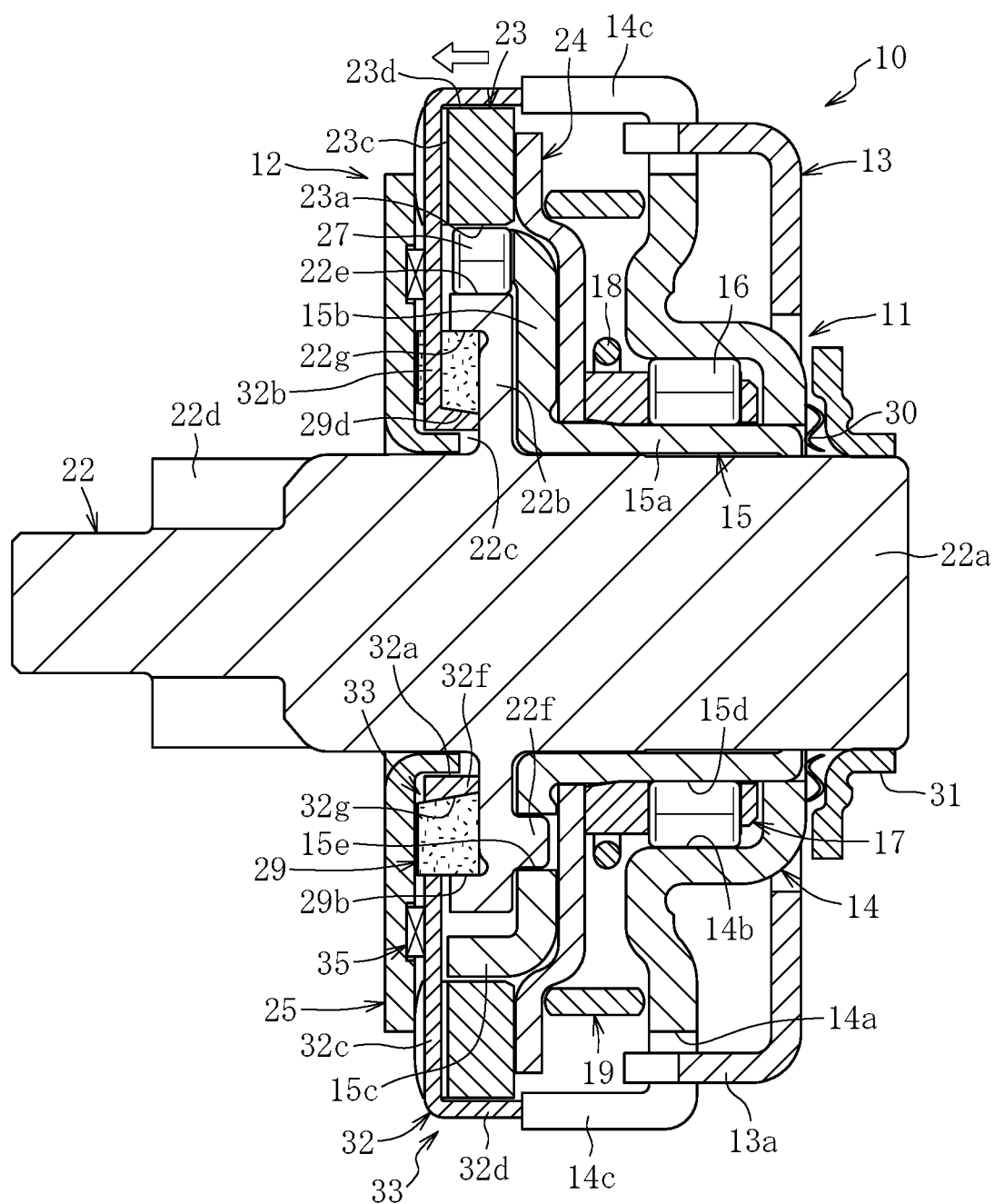
FIG. 9 is a sectional view for illustrating an operation state of the clutch unit of FIG. 1.

Meanwhile, when the rotational torque is input from the outer ring 14 of the lever-side clutch part 11, a phase shift occurs between the protruding parts 14c of the outer ring 14 and the cam grooves 32h of the collar parts 32d of the slide member 32 in the cam mechanism 34 of the brake-side clutch part 12. As illustrated in FIG. 9, as a result of the phase shift between the protruding parts 14c and the cam grooves 32h, the slide member 32 moves in the axial direction so as to approach the side plate 25 against the elastic force of the elastic member 35 (see the outlined arrow in FIG. 9).

The state in which the tapered surface 32g of the slide member 32 is pressing the friction ring 29 outward in the radial direction through the tapered surface 29d of the friction ring 29 is released through the movement of the slide member 32 in the axial direction. That is, such a pressing force as causing the friction ring 29 to be radially expanded does not act, the slide torque of the friction ring 29 thus decreases, and the rotational resistance applied to the output shaft 22 can be decreased from that given when the output shaft 22 is locked. As a result, the output shaft 22 is brought into a state of being rotatable relative to the outer ring 23 while the appropriate rotational resistance is applied to the output shaft 22 by the friction ring 29.

As described above, the slide member 32 can easily be moved in the axial direction by the cooperation of the cam mechanism 34 and the elastic member 35 in the variable part 33. Moreover, as a result of the employment of the joint structure between the tapered surface 32g of the slide member 32 and the tapered surface 29d of the friction ring 29, the friction ring 29 can easily be displaced in the radial direction (radially expanded) through the movement of the slide member 32 in the axial direction.

The rotational resistance applied to the output shaft 22 can easily be changed by the variable part 33 through increase and decrease in slide torque of the friction ring 29, which is generated by the pressure contact with the output shaft 22 between the input of the rotational torque (the transmission of the rotational torque) through the lever operation and the lock of the output shaft 22 (the interruption of the rotational torque) through the seating on the seat 40.

The brake-side clutch part 12 is configured so that, when the rotational torque is input through the lever operation, the cylindrical rollers 27 are not disengaged by the inner ring 15 until the slide torque of the friction ring 29 decreases to cause the rotational resistance applied to the output shaft 22 to fall below the rotational resistance given when the output shaft 22 is locked and enable the rotation of the output shaft 22. Moreover, on this occasion, a certain backlash in the rotational direction is set in the lever-side clutch part 11 so that the cylindrical rollers 16 do not engage with the wedge gaps 20 between the outer ring 14 and the inner ring 15.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

The invention claimed is:

1. A clutch unit, comprising:
    a lever-side clutch part, which is provided on an input side, and is configured to control transmission and interruption of a rotational torque input through a lever operation; and
    a brake-side clutch part, which is provided on an output side, and is configured to transmit the rotational torque from the lever-side clutch part to the output side, and interrupt a rotational torque reversely input from the output side,
    wherein the brake-side clutch part comprises:
        a stationary member which is constrained in rotation;
        an output member configured to output the rotation;
        an engaging element configured to control the interruption of the rotational torque reversely input from the output member and the transmission of the rotational torque input from the lever-side clutch part through engagement and disengagement between the stationary member and the output member;
        a brake member configured to apply a rotational resistance to the output member; and
        a variable part configured to change the rotational resistance applied to the output member between the transmission and the interruption of the rotational torque,
    wherein the variable part comprises a slide member arranged so as to be movable in an axial direction relative to the brake member, and
    wherein the variable part is configured to allow the slide member to be movable in the axial direction by cooperation of a cam mechanism, which is provided between the slide member and an input member of the lever-side clutch part, and an elastic member, which is provided between the slide member and the stationary member of the brake-side clutch part.

2. The clutch unit according to claim 1,
    wherein the slide member is to be joined to the brake member at a tapered surface extending in the axial direction, and is configured to increase and decrease a slide torque, which is generated by a pressure contact between the brake member and the output member, by displacing the brake member in a radial direction by the movement of the slide member in the axial direction through a tapered surface joint.

3. The clutch unit according to claim 1, wherein the lever-side clutch part and the brake-side clutch part are assembled to a seat lifter part for an automobile.

4. The clutch unit according to claim 2, wherein the lever-side clutch part and the brake-side clutch part are assembled to a seat lifter part for an automobile.

* * * * *